United States Patent Office 3,073,040
Patented Jan. 15, 1963

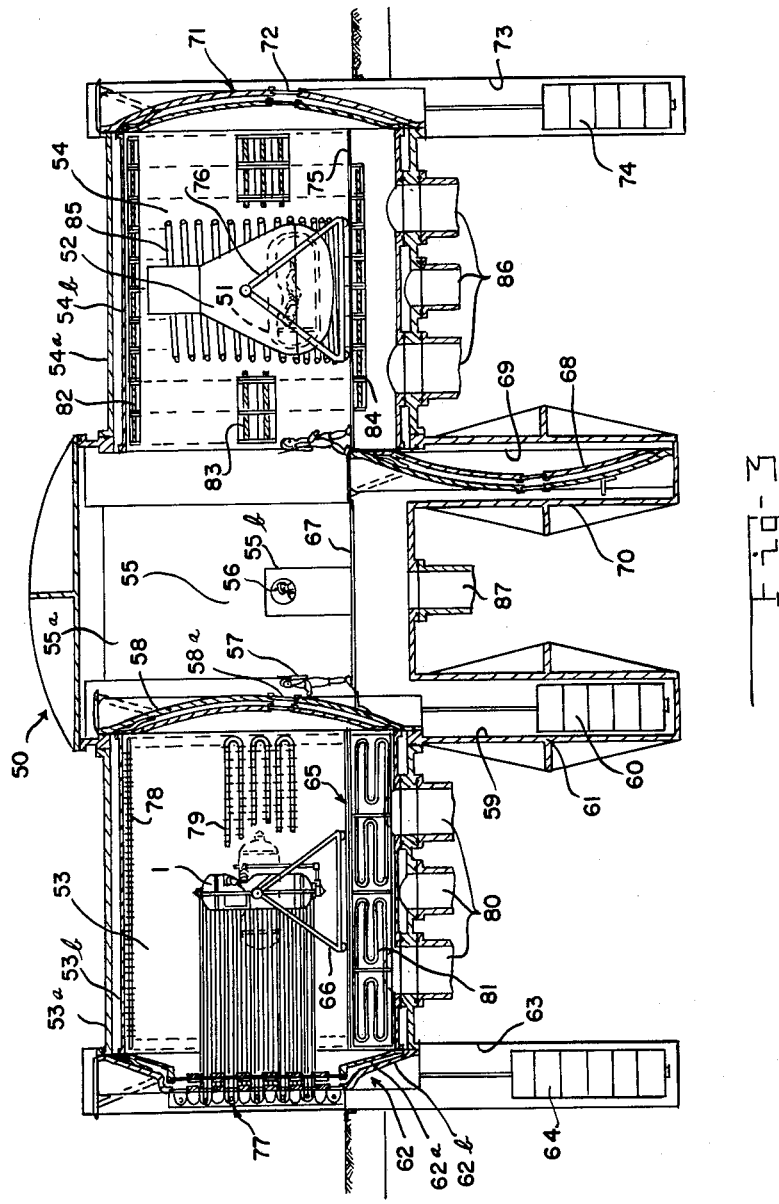

3,073,040
MULTI-PURPOSE SPACE CAPSULE
Otto Schueller, Dayton, Ohio, assignor to the United States of America as represented by the Secretary of the Air Force
Filed Mar. 20, 1961, Ser. No. 97,116
9 Claims. (Cl. 35—12)
(Granted under Title 35, U.S. Code (1952), sec. 266)

The invention described herein may be manufactured and used by or for the United States Government for governmental purposes without payment to me of any royalty thereon.

This invention relates generally to personnel protective equipment for use in outer space and, more particularly, to a personnel protective equipment system utilizing an improved space capsule.

With the advent of the new space era eventually involving the development of a variety of operational type rocket ships, travel in outer space by the prospective astronaut is now all but accomplished. Of course, the environment of outer space lacks in the normal, life-supporting properties considered so necessary for human existence and, as a matter of fact, any exposure therein of the unprotected space man would prove fatal within approximately one minute or less. In accordance therewith, a variety of scientific disciplines have arisen to the challenge of solving the many and varied problems involved in providing the prospective astronaut with a micro-environment in outer space incorporating all of the necessary life-supporting properties required for man to exist and thus effecting a man-made environment independent of that of outer space. Although a number of notable achievements short of the desired goal have already been accomplished, the attainment of the final goal has never been in doubt, although not yet accomplished. In connection with the latter, it is to be noted that the basic life-supporting properties have, in fact, heretofore been provided for manned aircraft flights at relatively high altitudes without too much difficulty. However, it has been an entirely different and much more difficult matter to design a pressurized suit or garment for use in outer space flight. One example of this increased difficulty of the design of an outer space suit is the proposition that the present-day space suit becomes relatively stiff when inflated to render the wearer correspondingly immobile. Such a relatively stiff condition effects a corresponding lack of comfort and a relative inability to perform more than the most rudimentary functions.

The aforesaid problem of relative immobility becomes extremely critical during the exacting performance required of the jet pilot, for example, flying the modern-day, high speed, high altitude jet aircraft. In the event of an emergency such as a sudden loss of cabin pressure or a high speed ejection both automatically effecting inflation of the pilot's pressurized suit, the wearer may perform little more than emergency procedures to effect an escape. Such relative immobility becomes even more critical when considered in the light of future prolonged operations into outer space or while engaged in the assembly of space platforms, for example, and the like while operating completely outside the transport space vehicle. Under such conditions, the need arises for some kind of advanced space suit and/or space capsule providing both the necessary "built-in" safety and comfort and, additionally, increased mobility. In addition to the aforesaid problems of comfort, safety and mobility in general, certain other problems are also present. For example, accessories including helmets, oxygen conditioning systems and ventilating garments must, of course, be developed and then integrated with each other and with the basic garment itself. Moreover, the entire assembly must be designed to withstand wind blast, and other forces normally encountered in a high speed ejection, for example, and, finally, the basic garment must be adaptable for ease of putting on and removal thereof. These problems are greatly simplified in the inventive Multi-Purpose Space Capsule as will be seen hereinafter.

Thus, it is clear that increasing developments in the field of rocketry foretelling eventual travel of manned space craft into outer space and to the planets has led to certain definitely established life-support systems requirements for survival in these areas. Moreover, future astronauts will undoubtedly be required to perform certain ordinary functions and operations while engaged in orbital or interplanetary space flights which will, of necessity, require the performance of certain ordinary arm, leg and body movements while engaged in the completion of a variety of missions outside of the space vehicle itself. Further, some system will be required for facilitating independent movement of a space capsule, for example, when outside the space vehicle. Some of these missions will undoubtedly include the assembly of space stations, space ships and space platforms, the loading and unloading of supply vehicles, the repair and maintenance of reconnaissance platforms, relay stations and observatories, and the operation of weapons and instruments as well as many other purposes all requiring considerable mobility, if the performance thereof is to prove successful. This, of course, automatically leads to the use of space suits, space capsules and other similar arrangements designed to provide all of the required life-supporting properties and, also, the requisite mobility for the successful accomplishment of assigned missions. Some of the protections necessary in such a space suit or capsule or other arrangement include protection from the extremes of temperature, lack of oxygen, radiation and accelerative forces, and provision for food and water, waste disposal and the ability to perform useful work in addition to providing some means of propulsion and communication. As a result of more recent developments in the field of pressurized suits and cabins, the multi-purpose space capsule of the instant invention has been developed.

In the development of personal protective equipment, both pressurized cabins and space suits have undergone considerable exploitation and are now in a relatively fine state of development. It is to be pointed out that these two systems are, in fact interdependent and, as such, each depends on the other for a completely integrated and safe system. Moreover, each presents its own problems and is important to a protective system offering sufficient protection against sudden decompression or the like. In regard thereto, any loss or decompression of cabin pressure or a rupture of the pressure suit would prove fatal. Additionally, use of the pressurized suit is characterized by two disadvantages, restricted mobility and corresponding lack of comfort leading to the use of the present-day ventilated suit incorporating anti-G protection. Also, internal suit pressures are maintained at substantially the same level as the cabin pressure to thereby achieve a double safety factor and relatively unrestricted mobility during normal operation. Thus, in an emergency (as for example, decompression of the cabin or ejection at high altitude), the pressurized suit is designed to automatically inflate, in which event, the internal pressure thereof is no longer balanced by external pressure, thus substantially reducing the relative mobility of the wearer although sufficient mobility remains to enable the wearer to normally return safely to earth. Thus, the combination of a pressurized cabin and an emergency pressure suit (normally uninflated) constitutes a proven safety system which seems to be a reasonable solution to the hazardous conditions of space flight.

The utilization of personal protective equipment incorporating the requisite life-supporting properties necessitates a system of relatively heavy weight. This relatively heavy weight constitutes a mass affording greater stability for arm, leg and body motions of the wearer especially during the periods of weightlessness normally encountered in outer space and at orbital speeds. Despite this advantage of increased stability, the increase in weight inherent therein naturally results in higher fuel consumption and reduced payload and vehicular performance. In order to take advantage of the increased stability effect of a relatively large mass and, at the same time, reduce overall weight, the aforesaid personal protective assembly is reduced to the improved multi-purpose space capsule of the present invention which is formed as an integral part of the transport vehicle and is easily removable therefrom. In brief, such a space capsule as in the subject invention, which will be described in more detail hereinafter, is substituted for the entire pressurized cabin space normally utilized in previous high altitude aircraft, thus effecting a considerable reduction of gross weight. Perhaps more importantly, the previously-mentioned problem of relative immobility resulting from the inflated condition of the pressurized suit is substantially eliminated even during emergency periods or when the prospective astronaut is either forced or required to leave the main space ship as will hereinafter be described in detail.

It is an object of the present invention, therefore, to utilize a multi-purpose space capsule arrangement incorporating improved means facilitating relative mobility of the man enclosed therein while performing certain desired missions outside of the space vehicle.

A further object of the invention resides in an integrated protective assembly normally formed as part of the transport vehicle and providing the requisite life-supporting properties for human existence.

Another object of the invention is the provision of a unique and improved space capsule having relatively lightweight pressure compensated arm sections for accomplishing useful work within the normal arm's reach while operating in unusual environments.

A still further object of the invention utilizes an improved space capsule for housing a space man therein and having means adaptable for removable mounting within a transport vehicle or space chamber or for independent movement outside the transport vehicle while performing assigned missions in the environment of outer space.

Other objects and advantages of the invention will become apparent from the following description taken in connection with the accompanying drawings, in which like reference characters refer to like parts in the several figures.

FIG. 3 illustrates the space capsule of FIGS. 1 and 2 mounted within a test facility similar to that described in my co-pending patent application, Serial No. 6,330, filed February 2, 1960, now Patent No. 3,010,220.

Figure 1:
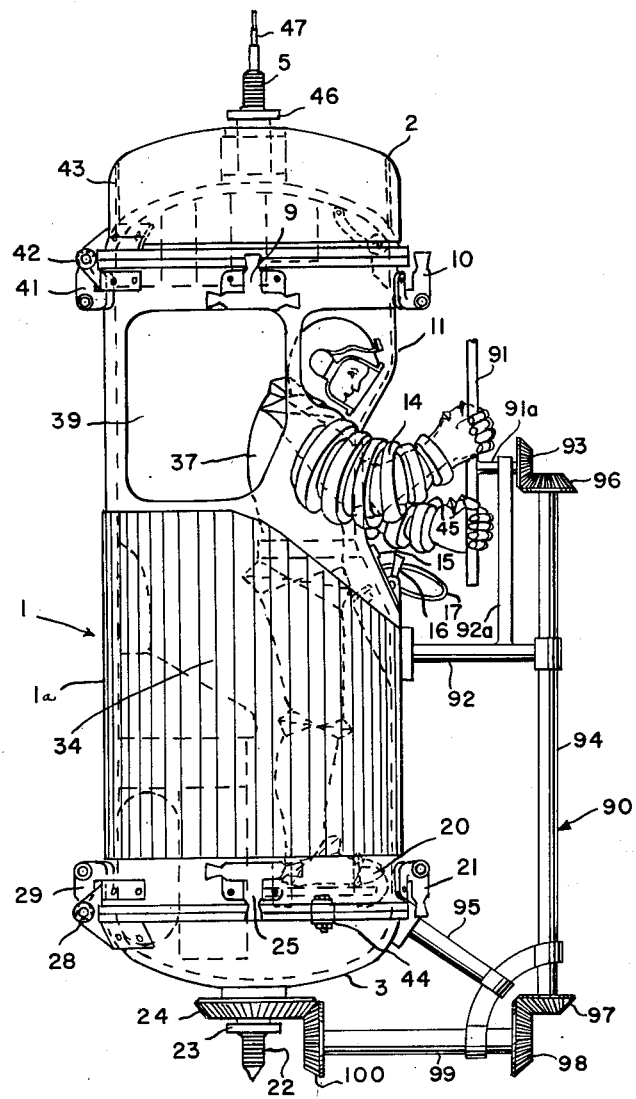
FIG. 1 illustrates an upright view of the space capsule of the invention showing a space man therein in working or standing position.
Figure 2:
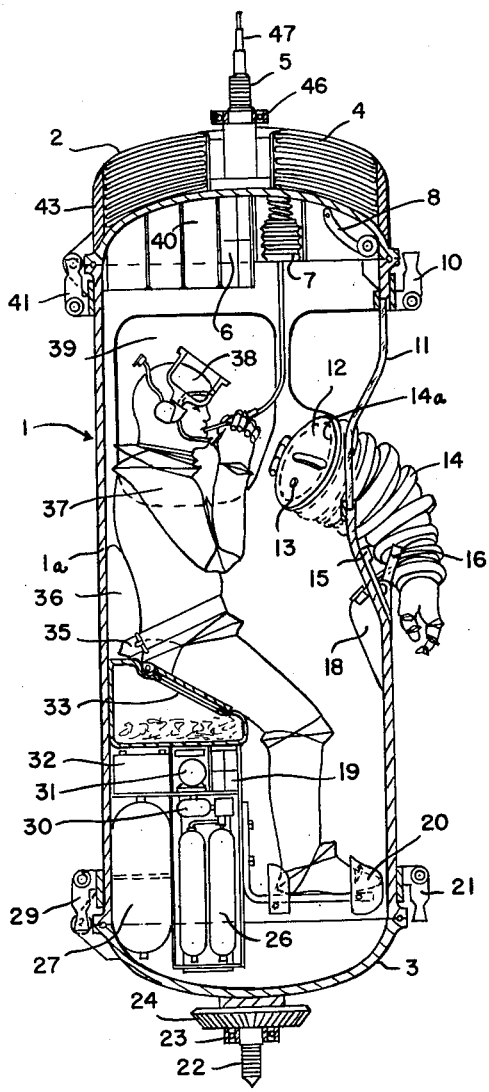
FIG. 2 is a longitudinal sectional view of the upright space capsule of FIG. 1, illustrating additional details thereof with the man therein in the rest or seated position.

Referring specifically to FIGS. 1 and 2 of the drawings, the space capsule of the instant invention is indicated generally at 1 as including a main body portion substantially cylindrical in shape and indicated at 1a and an upper and a lower capsule cover indicated respectively at 2 and 3 as hinged at 42 and 28, respectively, for pivoting thereof between an open and a sealed, closed position as by means of the locker device indicated generally at 8 for upper capsule cover 2 and a plurality of bolts, one of which is illustrated at 44 for lower capsule cover 3. Within said space capsule 1 is housed a prospective space man or astronaut shown clearly wearing an emergency pressure and ventilation suit indicated generally at 37 in the standing position of FIG. 1 and in the sitting position of FIG. 2. In the latter view, the space man is shown resting on the upper surface of the waste and refuse disposal container 33. The body portion 1a of space capsule 1 also incorporates a pair of side observation windows, one of which is illustrated by the reference numeral 39 and a front observation window illustrated at 11. Immediately adjacent to and below the front window 11 is located a pair of hingedly mounted covers, one of which is illustrated at 12 for the arm hole indicated at 14a, which arm hole 14a is enclosed by the inner, open end portion of an extensible arm portion 14. An identical extensible arm portion is illustrated at 45 (note FIG. 1). Said extensible arm portions 14 and 45 may be pressure compensated in the specific manner described and claimed in my co-pending patent application Serial No. 103,663, filed April 17, 1961.

Within the previously-mentioned upper capsule cover 2 is positioned the parachute 4 provided for capsule recovery, if needed, and protected by the protection wall indicated at 43. Also extending upwardly and downwardly from each of upper and lower capsule covers 2 and 3 are the ball bearings indicated respectively at 46 and 23 for holding space capsule 1 in either its transport vehicle or re-entry body or in a test facility as will be hereinafter described in detail with respect to FIG. 3 of the drawings. Moreover, said upper and lower capsule covers 2, 3 also mount a plurality of collecting rings indicated respecitvely at 5 and 22 formed as part of the circuit for a D.C. motor (not shown since it forms no part of the present invention) to provide electrical power within said space capsule as needed. Adjacent to collecting rings 5 and extending upwardly therefrom is mounted an extensible antenna indicated at 47, which antenna is utilized to provide for communication for said space capsule 1. A cone gear indicated at 24 is provided adjacent the aforesaid lower capsule cover 3 and between said ball bearings 23 and the face of said cover 3 for the purpose of turning or rotating capsule 1 in the transport vehicle, re-entry body or space facility as will hereinafter be described in detail relative to FIG. 3 of the drawings. Also, positioned within said space capsule 1 are schematic showings of an oxygen conditioning system 26, fuel containers for the propulsion system as indicated at 27, and an oxygen compressor, converter and battery indicated schematically and respectively at 30, 31 and 32. Further, a plurality of propulsion rockets may be provided as indicated schematically at 9, 10, 21, 25, 29 and 41, respectively, which propulsion rockets are utilized for providing independent movement of space capsule 1 away from its transport vehicle or space station. Of course, so long as the space worker is actually in contact with the transport vehicle or space station he may transport himself by means of an appropriate set of cables and hooks in any desired maner. Such a system is not shown since it forms no part of the present invention. However, during the assembling or repairing of a space station, for example, the space worker would undoubtedly be required to carry a variety of tools and parts to particular locations and positions and to connect each tool and individual part both with the space worker, the transport vehicle and the space station would prove both cumbersome and impractical since such a system would result in a continuous pulling and pushing of all parts, tools, men and vehicles substantially reducing the time remaining to perform the actual work. Furthermore, each movement to transfer a part or a tool from one location to another would produce an equal and opposite reaction resulting in needless work. Moreover, should a cable slip or tear off from a moving part or even from the man himself, the part or man would theoretically continue to move away therefrom, forever, since in all probability no friction exists in outer space to stop any such motion once induced. In addition, the use of walking or swimming motions would prove not feasible in outer space since such motions would result in turning or tumbling only for each movement of the body, however, its center of mass would not move away from the particular location. Accordingly, some type of propulsion system is necessary to accomplish appropriate movements in space. Obviously, a single reaction device would prove unsatisfactory for the reason that it would be too difficult to always direct the propulsive force against the center of mass and tumbling only would often result. Thus, a number of small rockets or jets and retrorockets with necessary control and stabilizing means may be utilized to enable the space worker to move in any desired direction without tumbling. In accordance therewith, the space capsule 1 of the instant invention incorporates the plurality of rockets, previously described as being illustrated in schematic form by the reference numerals 9, 10, 21, 25, 29 and 41. In addition, the space man or astronaut has a control stick indicated at 16 for controlling the propulsive system within his space capsule and an instrument and push button panel indicated generally at 18 (note FIG. 2). The aforesaid space capsule 1 also provides for a control and stabilizing gyro device for the propulsion system, as indicated schematically at 19 in FIG. 2 of the drawings and, also, said capsule 1 comes equipped with adjustable foot pedals for actuating the propulsion control as seen schematically at 20. Of course, any impulse given to the space worker by one or more of the previously-mentioned rockets would effect movement in one direction indefinitely until another impulse of the same magnitude and in the opposite direction was applied. The aforesaid control and gyro stabilizing device 19 would provide for each such impulse an equal counter impulse, when desired, on actuation thereof by said control stick 16 and/or the foot pedals 20 to thereby free the arms for working.

The pressure compensated arm portions, 14, 45 are further equipped with a loop affixed to the side of body portion 1a of space capsule 1, one of which is depicted at 17, for retention thereof in fixed position when not in use. The hingedly mounted arm hole cover 12 is also equipped with a relief valve 13, in which event, said arm portions 14, 45 may also be used as pressure locks to facilitate transfer of parts inside the capsule 1. Said relief valve would be utilized to equalize the pressure therein after the arm portion has been opened to outer space. Further, the space worker within space capsule 1 is equipped with a helmet visor pivotal as clearly illustrated at 38 in FIG. 2 of the drawings between an open and a closed position to permit drinking from the liquid food container 7 or eating from the solid food storage 6. Finally, the space worker is provided with a storage area indicated generally at 40 in which boxes for a communication device, tools, instruments and first aid kit may be stored. The space worker is also equipped with a personal parachute at 36 and a safety belt 35.

With particular reference to FIG. 3 of the drawings, a test facility indicated generally at 50 is utilized for reproducing both the conditions encountered during a re-entry into the earth's atmosphere and the environmental conditions of outer space, which test facility 50 includes a left or space chamber 53, a right or re-entry chamber 54 and a middle or safety chamber 55 interposed therebetween. The space capsule 1 of the invention is positioned within left or space chamber 53. A re-entry body is shown schematically at 52 as mounted in right or re-entry chamber 54 and a companion space capsule indicated in dotted line position at 51 may be housed within said re-entry body for further flexibility in use of the test facility 50. In connection with the aforesaid test facility 50, it is noted that previously utilized standard altitude chambers have proven unsatisfactory for simulating the environmental problems involved in the proper test of space suits and manned capsules. Some other means must be provided for obtaining test data relative to the relatively limited tolerable temperature range and varying biological requirements of man for orbital and interplanetary flights. Accordingly, the test facility 50 illustrated in FIG. 3 of the drawings, the details of which are described and claimed in my copending application, Serial No. 6,330, filed February 2, 1960, now Patent No. 3,010,220, was specifically developed for testing of space capsules and space suits and the like as will hereinafter be described in more detail. The previously-mentioned left or space chamber 53 of test facility 50 includes an outer wall 53a and an inner wall 53b. Similarly, right or re-entry chamber 54 incorporates an outer wall and an inner wall indicated respectively at 54a and 54b. The middle or safety chamber 55 positioned in communicating relation between space and re-entry chambers 53, 54 incorporates a relatively large door indicated generally at 55a having a relatively small door indicated at 55b through which may be seen an outside observer indicated at 56. An inside observer is depicted at 57 within said safety chamber 55 as positioned for viewing the inside of left or space chamber 53 through means of an observation window 58a formed in the inner doubled-walled connecting door indicated generally at 58 which door 58 is adapted for sliding movement in a vertical direction into and out of a door well indicated generally at 59 against action of the counterweights indicated at 60 for opening and closing a full-sized doorway between space and safety chambers 53, 55. Said door well 59 is formed by means of a vacuum-tight housing indicated generally at 61. Said left or space chamber 53 also incorporates another door 62 having an inner wall 62a and an outer wall 62b which outer door is adapted for sliding movement in a vertical direction into and out of a door well indicated at 63 against action of the counterweights indicated at 64.

A platform indicated by the reference numeral 65 is positioned within space chamber 53 at floor level on which platform 65 is slidably positioned a gimbal support 66 for gimbal mounting the space capsule 1 of the invention. At this point, it is noted that space capsule 1 is so gimbal-mounted within space chamber 53 to enable movement thereof to a plurality of different positions or attitudes for test purposes as will be explained in more detail hereinafter. A second platform indicated at 67 is mounted within safety chamber 55 and extends across the entire chamber in alignment with platform 65 in space chamber 53 at floor level. Further, a second inner door interconnecting safety chamber 55 and right or re-entry chamber 54 is illustrated at 68 in open position within the door well 69 of a vacuum-tight housing indicated at 70. Said right or re-entry chamber 54 also incorporates an outer double-walled door 71 incorporating an observation window 72 and adapted for sliding movement in a vertical direction into and out of its open position within door well 73 against action of counterweights 74. A platform indicated at 75 is shown mounted also at floor level within re-entry chamber 54 on which platform is slidably positioned a second gimbal support 76 which support 76 gimbal mounts the previously-mentioned re-entry body 52 which, in turn, supports the aforesaid companion space capsule 51 which is, of course, identical to the aforesaid space capsule 1 of the present invention. The gimbal structure supported by supports 66, 76 is not specifically illustrated since the specific details thereof are unimportant to the present invention.

In order to provide adequate means for studying many of the complex problems involved in the use of space capsules of the type disclosed in the present invention, the test facility 50 illustrated in FIG. 3 of the drawings is utilized for the purpose of mounting (as hereinbefore stated) the space capsule 1 of FIGS. 1 and 2 of the drawings within the left or space chamber 53 in supporting relation within the aforesaid gimbal support 66. The aforesaid capsule 1 may be rotated about its longitudinal axis to any of a number of desired positions or attitudes to thereby vary the degree of exposure to radiation, for example, of a test subject positioned within said capsule by means of the attitude control means shown generally at 90 in FIG. 1 of the drawings. Said attitude control means 90 may include the main control arm 91 (operable by a test subject or prospective astronaut positioned within capsule 1) pivotally mounted on body portion 1a of the inventive space capsule by means of an upwardly-extending extension portion 92a incorporated on the upper supporting bracket 92 which provides pivotal support for the stub shaft, pivot member 91a incorporated on said main control arm 91. To the outer ends of said member 91a is affixed the upper cone gear 93. A relatively elongated, interconnecting member is shown at 94 as affixed to said body portion 1a by means of the previously-described upper supporting bracket 92. Further support is provided for member 94 by a lower supporting bracket 95. Affixed to opposite ends of said interconnecting member 94 are upper and lower interconnecting gear elements 96, in engagement with upper cone gears 93 and 97 in engagement with a first intermediate gear 98. The latter gear (98) is affixed to one end of an intermediatae member 99. To the opposite end of said member 99 is affixed a second intermediate gear 100 which gear 100 is in engagement with the previously-described lower cone gear 24 which is incorporated on the lower end portion of capsule 1. Thus, an astronaut in the space capsule 1 may, if desired, manually rotate control arm 91 through means of its piovt member 91a supported within upper supporting bracket 92 in either direction to, in turn, appropriately effect rotation of lower cone gear 24 and the inventive space capsule 1 through means of the interconnecting member 94, intermediate member 99 and the previously-described gears 93, 96, 97, 98 and 100. Said capsule 1 also may be turned to any of a number of other desired positions or attitudes to further vary the amount of exposure thereof to radiation, for example. The space capsule 1 may, for example, be adjusted to the vertical position (represented in solid lines in FIG. 3) which constitutes one of the extremes to which the space man housed therein might well be exposed under actual space environmental conditions. In said vertical position, the largest possible cross-sectional area of the capsule 1 is exposed to direct sun radiation and, in addition, to indirect solar radiation from the earth. Such direct sun radiation is simulated by a combination of high pressure mercury vapor lamps, tungsten lamps, filters and reflectors, arranged on the left or outer door 62 of space chamber 53, as is generally indicated at 77 in FIG. 3 of the drawings. The indirect solar radiation from the earth may be simulated by radiation reflected and emitted from the right or inner door 58 of the aforesaid space chamber 53. Of course, the total radiation falling onto the test object, which in this case is the manned space capsule 1, may be adjusted in accordance with its particular configuration or attitude merely by switching on or off an appropriate number of the aforesaid sun lamps. It is emphasized that the aforesaid indirect solar radiation, reflected, scattered and emitted by the earth and atmosphere is far from negligible and may amount to approximately 40% of the direct sun radiation falling onto an earth satellite, for example.

The horizontal position of space capsule 1, which is illustrated in dotted lines, represents another extreme condition wherein the manned space capsule may well be in the shade of the earth or of a space platform, for example. At this time, the amount of internal heat generated by the space man is at a minimum, while the largest possible surface area of the capsule 1 faces empty space, in which event, the plurality of sun lamps 77 are switched off. The extremely low temperature of outer space, which is in the neighborhood of absolute zero degrees, is simulated through cooling of the inner wall 53b of space chamber 53 with liquid or cold gases such as liquid helium, liquid nitrogen or liquid air, said gases being reliquefied in re- circulating cyrostats (not shown). For this purpose, a plurality of refrigerant coils may be provided as indicated generally and in partially broken away form at 78 and 79. Thus, liquid gas of the type mentioned is circulated within the coils 78, 79 to substantially simulate the extremely low temperatures of absolute zero degrees found in outer space. However, a temperature of the inner chamber wall 53b for the space chamber 53 may be regulated to approximately the boiling point of liquid nitrogen, for example, which is approximately 77° K. or —196° C. or —320° F. and this is considered quite satisfactory for the purpose of studying radiative heat transfer in outer space.

The aforesaid space chamber 53 is maintained at the near vacuum of outer space and, for this purpose, vacuum pumps (not shown) may be positioned below floor level. The previously-mentioned cryostats which are also not shown may likewise be positioned below floor level. Connections to both vacuum pumps and cryostats are shown in partially broken away form at 80 for said space chamber 53. Further positioned within space chamber 53 are the plurality of helium cooling traps indicated generally at 81 as also positioned below floor level which incorporate liquid or cold helium refrigerant gas at a temperature of approximately 20° K. (equal to —253° C. or —422° F.) in order to condense air leaking and gasing out from test objects positioned within the space chamber 53 and thus enable the maintenance of an approach to the near vacuum of outer space. The previously-mentioned re-entry body 52, positioned in gimbal-mounted relation as by means of said gimbal support 76 within the right or re-entry chamber 54, houses the aforesaid companion space capsule 51 for the purpose of subjecting the space man enclosed therein to both high temperatures and extremely low pressures in order to simulate, for example, the aerodynamic heating which might well be present within a re-entry body or vehicle during the re-entry phase of space travel. For this purpose, the aforesaid aerodynamic heating may be simulated also by means of special heat lamps arranged both around the walls of re-entry chamber 54 and beneath the platform 75 as indicated schematically and respectively at 82, 83 and 84. Moreover, in order to facilitate additional rapid heating of the skin of the re-entry body 52 in various degrees and with different temperature distributions, the high frequency coil as indicated generally at 85 in surrounding relation to re-entry body 52 may also be utilized. Further, re-entry chamber 54 is likewise provided with connections to vacuum pumps as indicated generally at 86 as mounted below floor level in order to maintain the desired low pressure conditions within the chamber. Finally, safety chamber 55 is also equipped with a connection to a vacuum pump below floor level as indicated generally at 87.

Again referring to FIG. 1 of the drawings, it is seen that the body portion 1a of space capsule 1 incorporates a plurality of circumferentially disposed blinds indicated schematically at 34 for a simple means of automatic temperature control. In connection with the latter, it is axiomatic that the space capsule 1 of the present invention must provide a reasonably comfortable climate for the space man or worker especially during prolonged periods of work or rest and, in connection therewith, it has been determined from recent air conditioning studies that the sedentary or slightly active man is comfortable when the dry-bulb temperature is between 73 and 77° F. and the relative humidity is from 25 to 60%. Of course, during the re-entry period of operation, higher temperatures co-incidental with some discomfort will be tolerated for a transistory emergency period; however, it has also been determined that human tolerance to enviornmental stress is not at all comparable with the tolerance of equipment. Airborne equipment in a modern bomber, for example, is designed to resist or withstand a temperature range of from —65° F. to +250° F., a pressure range of from between vacuum to full atmospheric pressure and a relative humidity range from zero to 100%. More significantly, future airborne equipment will be required to withstand temperatures of up to 1,000° F. resulting from the heat generated by aerodynamic friction. Of course, the establishment of a satisfactory temperature range in an instrumented, unmanned satellite, for example, does not present a serious problem since the range of tolerable climatic conditions therefor is relatively wide.

Although the maintenance of a tolerable climatic condition within an instrumented satellite is not a serious problem, the same situation does not exist for the manned satellite or space capsule as in the instant invention since the comfort range of man is relatively small as indicated above, and, additionally, heat output thereof is unpredictable. The latter may vary considerably between that occurring from a position at rest and that occurring from a position at work. In addition, the amount of heat generated in the oxygen conditioning system will vary in proportion thereto and the carbon dioxide production of the man, of course, increases according to his activity and heat output. Another factor of considerable importance is concerned with outside or external parameters involved therewith. Reconnaissance satellites will, for example, be required to cover the arctic as well as other regions and those satellites having their orbits inclined at more than approximately 60° angle to the equator may, of course, be in continuous sunshine for several days at a time. On the other hand, the space worker may take a rest in the shade of the space platform or the earth and thus the space capsule as at 1 of the subject invention may be subjected to continuous sun radiation while, at the same time, having the highest heat output generated by the space worker and equipment or, alternatively, be subjected to prolonged periods in the shade of the earth or of the space station during the lowest heat output of the space worker and equipment. It is clearly seen, therefore, that sufficient flexibility of radiative heat exchange between the inventive space capsule 1 and outside space must be provided under a variety of conditions. In other words, the emissive, absorptive and/or reflective surface properties of said space capsule 1 must be made adjustable for different spectoral regions. As one example of a unique and simplified means for accomplishing the aforesaid result, the space capsule 1 incorporates the previously-mentioned plurality of blinds indicated at 34 in FIG. 1 of the drawings, which blinds 34 are mounted for adjustment between open and closed positions in accordance with the temperature to which a standard thermostat (not shown since it forms no part of the present invention) connected therewith is exposed within the interior of the aforesaid space capsule. Of course, the collecting rings 5 and 22 previously described, are provided to adapt space capsule 1 for connection within the electrical circuit of a variety of power sources, as desired.

Referring again to the test facility 50 of FIG. 3 of the drawings, it is noted that three main chambers are provided, namely, a space chamber as at 53 on the left side, a safety chamber as at 55 in the center, and a re-entry chamber as at 54 on the right side as hereinbefore described. The safety chamber 55 is utilized primarily to permit instantaneous reversal of the test conditions as when an emergency exists and, secondarily, to rescue the test subject from within either space or re-entry chambers 53 and 54, if required. Of course, both space and re-entry chambers 53 and 54 utilize the double-walled principle with the space therebetween maintained at relatively low pressure approaching a vacuum which, with highly reflective surfaces, improves the insulation thereof.

It is noted that space diver-type suits may be preferred on permanent platforms and space busses having air locks and pressurized compartments whereas, space capsules as in the present invention offer, in effect, a small living room which is most important during prolonged periods of construction, for example. More importantly, space capsules with arm sections as in the present invention are most suitable for missions where relative independence from the transport space ship is desired or necessary and where relatively mobility is essential.

I claim:

1. A multi-purpose space capsule providing a micro-environment independent of ambient space conditions for a space man housed therein and incorporating protection from the extremes of temperature, lack of oxygen, radiation and accelerative forces, and provision for food, water and waste disposal and thus provide the requisite life-supporting properties for man to exist in outer space, said space capsule comprising a main body portion adapted to house a prospective space man therein in standing or sitting position and incorporating front and side observation windows and hingedly mounted arm-communicating cover portions and extensible arm portions integrally formed with the cover portions of said main body portion terminating in open end portions normally closed by said cover portions and adapted to accommodate the arms of the space man when said cover portions are open and extending outside of said main body portion, a pair of capsule covers fixedly positioned on the upper and lower end portions of said body portion in axial alignment therewith, said pair of capsule covers incorporating ball bearing, projectingly arranged, mounting means adapted for rotatable positioning within a supporting structure, and control means operatively associated between said extensible arm portions and said main body portion to vary the attitude of said capsule in a variety of positions, said control means including rotatable gear means incorporated on one of said ball bearing, projectingly arranged, mounting means for rotation with said space capsule and manually actuated interconnecting means operatively associated with said arm portions and in engagement with said rotatable gear means for rotatable operation of said space capsule to a variety of positions.

2. In a multi-purpose space capsule incorporating various life-supporting properties required in outer space to include protection from extremes of temperature, lack of oxygen, radiation and accelerative forces, and provision for food, water and waste disposal, a cylindrical, hollow and relatively elongated body portion adapted to enclose a test subject therein, and having cover elements equipped with relief valves to act as pressure locks integrally formed therein and hingedly mounted for movement between open and closed positions, hollow flexible arm members integrally formed as a pendant continuation to said cylindrical, hollow body portion and terminating at the upper ends thereof in opening portions covered by said cover elements and opening inwardly in communication with the interior of said elongated body portion and adaptable for conformance to the arms of the test subject, and means for supporting said cylindrical body portion within a transport vehicle, test chamber or re-entry body or the like, said means comprising an upper and lower ball bearing support in alignment with and mounted on the longitudinal axis of said cylindrical body portion and positioned, respectively, on the upper and lower end portions thereof and adaptable for rotatable mounting within the transport vehicle, test chamber or re-entry body or the like and means adapted for operation by engagement within said flexible arm members interconnected between said flexible arm members and the lower end portion of said cylindrical body portion in geared engagement with one of said ball bearing supports, said last-named means including a relatively elongated, vertically arranged, operating member operable at one end thereof by said flexible arm members and operably associated at the other end thereof with a relatively short, driven element interconnected between said vertically arranged, operating member and said one of said ball bearing supports to rotate said cylindrical body portion about its longitudinal axis.

3. In a multi-purpose space capsule as in claim 2, said supporting means comprising a gimbal mount for gimbal support of said cylindrical body portion of said space capsule at an intermediate position for slidably and pivotally supporting said space capsule between a vertical and horizontal position within the test chamber, transport vehicle or re-entry body or the like and varying the degree of exposure of said space capsule and the space man housed therein to the extreme temperatures of outer space environmental radiation conditions.

4. A multi-purpose space capsule comprising a main housing portion of sufficient size to enclose an astronaut therein and including front and side observation windows, food, water and oxygen supplies and other necessary life-supporting properties to include protection from extremes of temperature, radiation and accelerative forces, and provision for waste disposal, a plurality of rocket units positioned outwardly of said main housing portion and propulsion control means associated therewith for actuating and controlling said rocket units, at least one relatively elongated, pressure-compensated arm and hand element adapted to receive the arm of the astronaut and integrally formed with and extending outside of said main housing portion to provide relative mobility to said space capsule, at least one pressure lock element formed as an integral part of the inner end opening portion of said arm and hand element and a pair of capsule cover elements hingedly positioned on opposite end portions of said main housing portion for movement to open position to permit entry of the astronaut therewithin and to closed positions to seal the latter therein, and means extending outwardly of said space capsule in longitudinal alignment therewith for rotatably supporting said space capsule within a preselected transport vehicle, said last-named means including rotatable, bearing support means positioned in opposite relation on said capsule cover elements and mounted in suspending relation within an enclosing support structure, said bearing support means being affixed to a corresponding cover element and adapted for rotatable positioning within said enclosing support structure, and means interconnected with said arm and hand element and at least one of said bearing support means rotating said main housing portion about its longitudinal axis to a plurality of angularly related positions.

5. A multi-purpose space capsule as in claim 4, said interconnected means including a manually operable, relatively elongated control element operatively engaged with a gear element incorporated adjacent at least one of said capsule covers adjacent said ball bearing supporting element.

6. A multi-purpose space capsule as in claim 4, the pressure lock element of said pressure compensated arm and hand element having an inner opening in communication with the interior of said main housing portion adapted to receive the hand and arm of the astronaut enclosed therein and incorporating a hingedly mounted, integrally formed cover for pressure sealing of said pressure-compensated arm and hand portion.

7. A multi-purpose space capsule as in claim 6, said hingedly mounted cover incorporating a relatively small relief valve affording equalization of pressure therein on opening of said arm and hand element to outer space.

8. A multi-purpose space capsule as in claim 4, said main housing portion incorporating on the circumference thereof a plurality of thermostatically-controlled blind elements adapted for adjustment between open and closed positions and manually controlled from within the space capsule to adjust heat transfer between said space capsule and outer space.

9. A multi-purpose space capsule as in claim 8, in combination, with means for mounting said space capsule within a test facility having space, re-entry and safety chambers formed as an integral unit for subjecting the test subject to the various environmental conditions of outer space, said mounting means comprising relatively elongated means interconnected between said bearing support means and a gimbal mount slidably positioned within said space chamber and rotatably positioned on said relatively elongated means exteriorly thereof at an intermediate location to maintain said space capsule in suspended relation therein for rotation between vertical and horizontal positions about an axis transverse to the longitudinal axis of said space capsule to vary the effect of indirect and direct solar radiation simulated within said space chamber.

References Cited in the file of this patent

UNITED STATES PATENTS

| | | |
|---|---|---|
| 1,010,558 | Williamson | Dec. 5, 1911 |
| 1,491,938 | Wennerstrom | Apr. 29, 1924 |
| 1,881,929 | Pottenger | Oct. 11, 1932 |
| 2,489,879 | Grebe | Nov. 29, 1949 |
| 2,723,854 | Rebernigg | Nov. 15, 1955 |
| 2,977,080 | Von Zborowski | Mar. 28, 1961 |
| 2,986,361 | Codding | May 30, 1961 |